US011373031B2

(12) United States Patent
Dey et al.

(10) Patent No.: US 11,373,031 B2
(45) Date of Patent: Jun. 28, 2022

(54) SYSTEMS AND METHODS FOR IMPLEMENTING LAYOUT DESIGNS USING JAVASCRIPT

(71) Applicant: FusionCharts, Inc., Austin, TX (US)

(72) Inventors: Priyanjit Dey, Kolkata (IN); Nilarnab Mookherjee, Hooghly (IN)

(73) Assignee: FusionCharts, Inc., Austin, TX (US)

( * ) Notice: Subject to any disclaimer, the term of this patent is extended or adjusted under 35 U.S.C. 154(b) by 0 days.

(21) Appl. No.: 17/370,970

(22) Filed: Jul. 8, 2021

(65) Prior Publication Data

US 2022/0019727 A1 Jan. 20, 2022

Related U.S. Application Data

(60) Provisional application No. 63/051,679, filed on Jul. 14, 2020.

(51) Int. Cl.
*G06F 3/048* (2013.01)
*G06F 40/166* (2020.01)
*G06F 40/14* (2020.01)
*G06F 8/34* (2018.01)
*G06F 40/106* (2020.01)

(52) U.S. Cl.
CPC .............. *G06F 40/166* (2020.01); *G06F 8/34* (2013.01); *G06F 40/106* (2020.01); *G06F 40/14* (2020.01)

(58) Field of Classification Search
None
See application file for complete search history.

(56) References Cited

U.S. PATENT DOCUMENTS

| | | | |
|---|---|---|---|
| 6,738,079 B1* | 5/2004 | Kellerman | G06F 8/38 715/779 |
| 10,984,177 B2* | 4/2021 | Fialkow | G06F 16/958 |
| 2013/0174120 A1* | 7/2013 | Kalaidjian | G06F 8/34 717/113 |
| 2020/0372206 A1* | 11/2020 | Fialkow | G06F 40/106 |

OTHER PUBLICATIONS

M. Morris et al. "A field study of knowledge workers' use of interactive horizontal displays," 2008 3rd IEEE International Workshop on Horizontal Interactive Human Computer Systems, 2008, pp. 105-112.*
M. Moyeen et al. "An automatic layout faults detection technique in responsive web pages considering JavaScript defined dynamic layouts," 2016 3rd International Conference on Electrical Engineering and Information Communication Technology (ICEEICT), 2016, pp. 1-5.*

* cited by examiner

*Primary Examiner* — Maikhanh Nguyen
(74) *Attorney, Agent, or Firm* — Foley & Lardner LLP

(57) ABSTRACT

A method for implementing layout design is disclosed herein, including creating a container used to display a graphic, generating, at least one of one or more horizontal tracks and one or more vertical tracks housed within the container, the one or more horizontal tracks and one or more vertical tracks intersecting to create grids, placing digital content inside at least one of the one or more grids, sizing the one or more horizontal tracks and the one or more vertical tracks. Responsive to the sizing, determining a proper placement of the one or more horizontal tracks and one or more vertical tracks, by repeating the sizing of the one or more horizontal tracks and the one or more vertical tracks, and outputting an object, the object identifying parameters of the one or more horizontal tracks and the one or more vertical tracks.

20 Claims, 11 Drawing Sheets

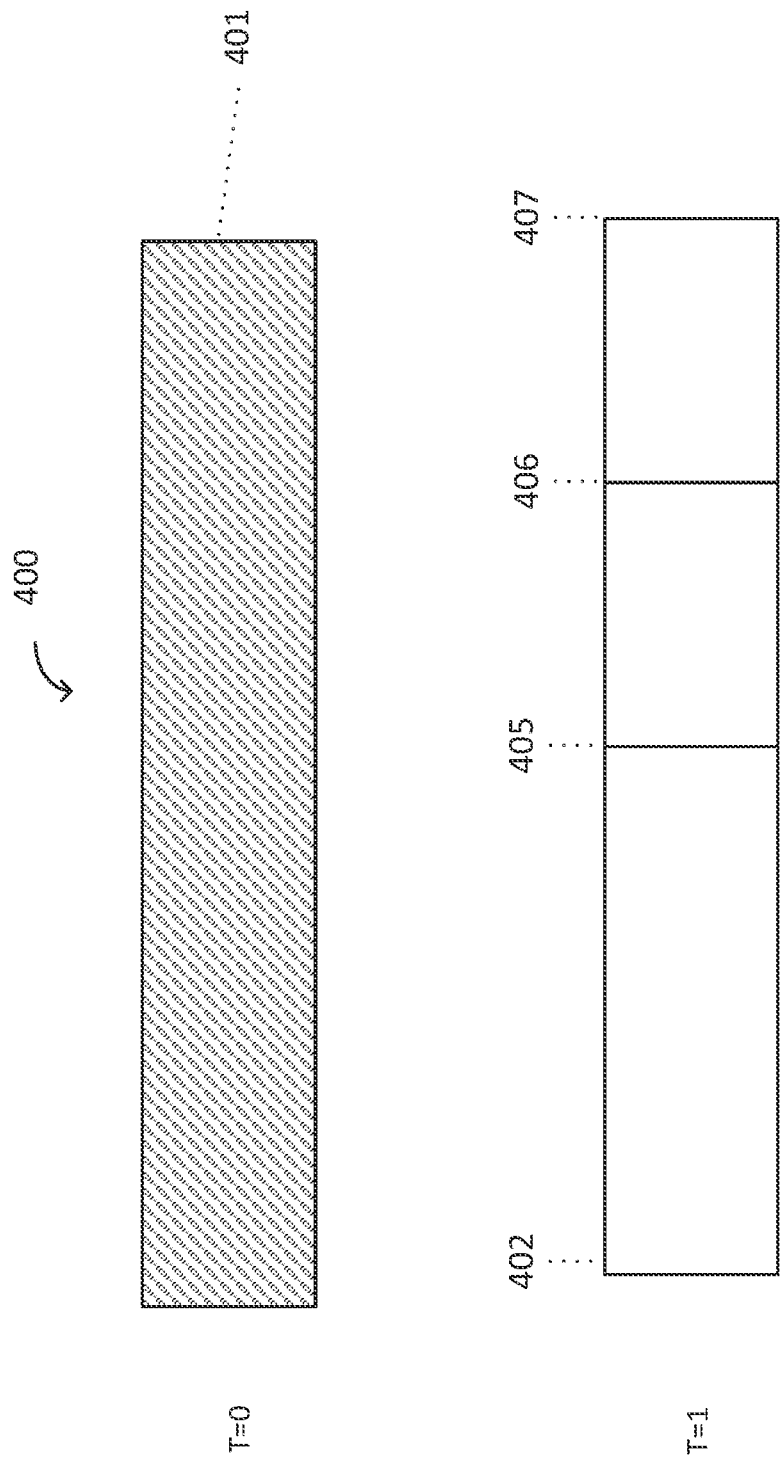

SYSTEMS AND METHODS FOR IMPLEMENTING LAYOUT DESIGNS USING JAVASCRIPT

CROSS-REFERENCE TO RELATED APPLICATIONS AND CLAIM OF PRIORITY

This application claims the benefit of U.S. Provisional Application No. 63/051,679, filed Jul. 14, 2020, the content of which are fully incorporated herein by reference in its entirety.

BACKGROUND

Webpages can be designed using web-based languages such as but not limited to, Hypertext Markup Language ("HTML"), Extension Markup Language ("XML"), JavaScript, and so on. These web-based languages are used to describe the content that can exist on the web pages. Web developers often use tools to help organize content on webpages. One example of a tool that developers use to help organize content is Cascading Style Sheets ("CSS"). CSS is a mechanism that developers can use to organize and add style to digital content such as color preferences, font preferences, background preferences, and so on.

Many webpages include graphics. Graphics can be positioned on the webpages via containers. The graphic can be inserted into the container such that the container keeps the webpage organized.

As more devices are able to connect to the internet, there is an increasing need to display and organize webpages on different types of devices. For example, webpages can be displayed on large TVs or small cell phone screens. The various screen widths, resolutions, display protocols, aspect ratios and so on make organizing content on various types of devices increasingly difficult.

SUMMARY

The example arrangements disclosed herein are directed to solving the issues relating to one or more of the problems presented in conventional layout design using a web-based language such as but not limited to a programming language capable of implementing complex features on web pages, as well as providing additional features that will become readily apparent by reference to the following detailed description where taken in conjunction with the accompanying drawings. In accordance with various arrangements, example methods and computer program products are disclosed herein. It is understood however, that these arrangements are presented by way of example and are not limited, and it will be apparent to those of ordinary skill in the art who read the present disclosure that various modifications to the disclosed arrangements can be made while remaining with the scope of this disclosure.

In some arrangements, a method for layout design includes creating, by a processor, a container used to display a graphic, generating, by the processor, at least one of one or more horizontal tracks and one or more vertical tracks housed within the container, at least one of the one or more horizontal tracks and one or more vertical tracks creating one or more grids in the container, the one or more horizontal tracks and the one or more vertical tracks defined by a first user preference, placing, by the processor, digital content inside at least one of the one or more grids, the processor placing the digital content based on a second user preference, sizing, by the processor, the one or more horizontal tracks and the one or more vertical tracks. The sizing of the one of more horizontal tracks and the one or more vertical tracks based on the second user preference and the digital content inside the container, responsive to the sizing of the one or more horizontal tracks and the one or more vertical tracks, determining, by the processor, a proper placement of the one or more horizontal tracks and one or more vertical tracks, by repeating the sizing of the one or more horizontal tracks and the one or more vertical tracks, and outputting, by the processor an object, the object identifying parameters of the one or more horizontal tracks and the one or more vertical tracks.

In further examples, the layout design method is implemented via a programming language capable of implementing complex features on web pages.

In further examples, the layout design is implemented via an application program interface on a user device.

In further examples, the one or more horizontal tracks and the one or more vertical tracks are defined by the processor.

In further examples, the processor defines the one or more horizontal tracks and the one or more vertical tracks based on a fraction of the available space in the grid.

In further examples, the processor defines the one or more horizontal tracks and the one or more vertical tracks based on the size of the digital content.

In further examples, the processor defines the one or more horizontal tracks and the one or more vertical tracks based on position of the digital content.

In further examples, a relationship between the container and the one or more grids is defined by a parent-child relationship.

In further examples, a child in the parent-child relationship defines a style.

In further examples, the style is based on a third user preference.

In further examples, the styles is based on determinations made by the processor.

In further examples, the style comprises at least one of alignment preferences and overlapping content preferences.

In further examples, a parent in the parent-child relationship defines the container.

In further examples, generating, by the processor, at least one of one or more horizontal tracks and one or more vertical tracks housed within the container, further includes generating, by the processor, one or more grid pads, the one or more grid pads placed at least adjacent to the one or more horizontal tracks and the one or more vertical tracks.

In further examples, the fitting by the processor is performed via an Auto Sizing algorithm.

In further examples, the Auto Sizing algorithm is based on one or more dimensions of the digital content within the corresponding grid.

In further examples, determining a proper placement of the one or more horizontal tracks and the one or more vertical tracks is performed via a Track Sizing algorithm.

In further examples, the Track Sizing algorithm further includes initializing, by the processor, a track size; resolving, by the processor, an intrinsic track size; and maximizing, by the processor, the intrinsic track size.

In further examples, identifying parameters of the one or more horizontal tracks and the one or more vertical tracks further includes identifying an x2 value, where x2 is the sum of an x value and a width value, where the width value is based on a width dimension of the container and the x value is based on a width dimension of the digital object; and identifying a y2 value, where y2 is the sum of a y value and a height value, where the height value is based on a height dimension of the container and the y value is based on a height dimension of the digital object.

Further examples relate to a computer program product comprising a computer-readable program medium code stored thereupon, the code, when executed by a processor, causing the processor to implement a method according to any of the above examples.

The above and other aspects and their implementations are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 4C is a diagram of an example container housing partitioned vertical tracks, according to some arrangements.

DETAILED DESCRIPTION OF THE DRAWINGS

Figure 1A:
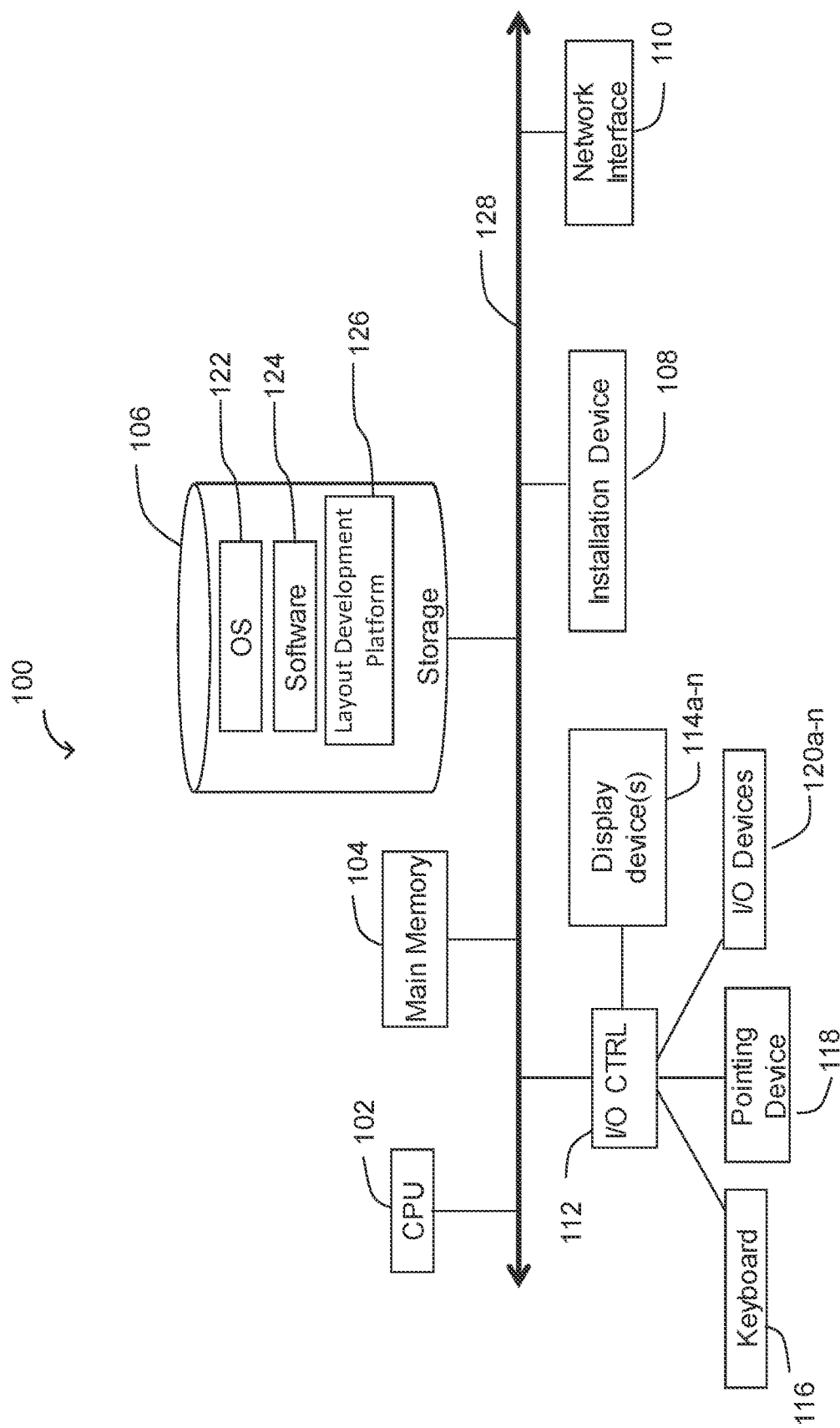
FIG. 1A is a block diagram of a computing device that can be used to design a layout via SVG, according to some arrangements.

Hereinafter, example arrangements will be described in more detail with reference to the accompanying drawings, in which like reference numbers refer to like elements throughout. The present disclosure, however, can be embodied in various different forms, and should not be construed as being limited to only the illustrated arrangements herein. Rather, these arrangements are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description.

The present disclosure relates generally to implementing layout designs using a web-based language such as but not limited to a programming language capable of implementing complex features on web pages, including a layout design tool that allows developers to position graphics such as but not limited to Scalable Vector Graphics ("SVG").

Some web developers use a layout designed called Canvas to organize graphics on a webpage. Other developers use SVG to organize graphics on the page. Responsive web design is the design of webpages such that the pages have layout appearances that are able to suit different screen widths, resolutions, display protocols, aspect ratios, and so on. When a part of the webpage is designed using Canvas or SVG, the web developer takes extra measures to create a responsive web site. For example, webpages that may be designed using Canvas or SVG may perform extra calculations to show the content of the webpage elegantly, based on the size of various screen readers.

In contrast, by definition, SVGs are vector based graphics. This means that a vector image can be composed from a fixed set of shapes. SVG uses shapes, numbers and coordinates rather than pixels to render graphics in an image. Thus, the shape of the image can be preserved even when the scale of the image changes, without any extra calculations based on the size of the screen readers.

Tools like CSS can be very effective in facilitating web developers to position objects on a webpage. CSS however, is limited to supporting objects based in HTML. Accordingly, a method for implementing layout designs that support SVG objects can be desired. For example, a tool that facilitates layout design and supports SVG object placement can be FaberJS, a tool written in JavaScript.

The above information disclosed in this Background section is for enhancement of understanding of the background of the disclosure, and therefore, it can contain information that does not constitute prior art.

In some arrangements, a method for layout design includes creating, by a processor, a container used to display a graphic, generating, by the processor, at least one of one or more horizontal tracks and one or more vertical tracks housed within the container, at least one of the one or more horizontal tracks and one or more vertical tracks creating one or more grids in the container, the one or more horizontal tracks and the one or more vertical tracks defined by a first user preference, placing, by the processor, digital content inside at least one of the one or more grids, the processor placing the digital content based on a second user preference, sizing, by the processor, the one or more horizontal tracks and the one or more vertical tracks. The sizing of the one of more horizontal tracks and the one or more vertical tracks based on the second user preference and the digital content inside the container, responsive to the sizing of the one or more horizontal tracks and the one or more vertical tracks, determining, by the processor, a proper placement of the one or more horizontal tracks and one or more vertical tracks, by repeating the sizing of the one or more horizontal tracks and the one or more vertical tracks, and outputting, by the processor an object, the object identifying parameters of the one or more horizontal tracks and the one or more vertical tracks.

In some arrangements, the layout design method is implemented via a programming language capable of implementing complex features on web pages. Further, the layout design is implemented via an application program interface on a user device. Further, the one or more horizontal tracks and the one or more vertical tracks are defined by the processor. Further, the processor defines the one or more horizontal tracks and the one or more vertical tracks based on a fraction of the available space in the grid. Further, the processor defines the one or more horizontal tracks and the one or more vertical tracks based on the size of the digital content. In alternate arrangements, the processor defines the one or more horizontal tracks and the one or more vertical tracks based on the position of the digital content.

In some arrangements, a relationship between the container and the one or more grids is defined by a parent-child relationship. In addition, a child in the parent-child relationship defines a style. Further, the style is based on a third user preference. In alternate arrangements, the style is based on determinations made by the processor. Further, the style includes at least one of alignment characteristics and overlapping content characteristics. Further, a parent in the parent-child relationship defines the container.

In some arrangements, generating, by the processor, at least one or one or more horizontal tracks and one or more vertical tracks housed within the counter further includes generating, by the processor, one or more grid pads, the one or more grid pads placed at least adjacent to the one or more horizontal tracks and the one or more vertical tracks. Further, the fitting by the processor is performed via an Auto Sizing algorithm. Further, the Auto Sizing algorithm is based on one or more dimensions of the digital content within the corresponding grid. Further, determining a proper placement of the one or more horizontal tracks and the one or more vertical tracks is performed via a Track Sizing algorithm. Further, the Track Sizing algorithm includes initializing, by the processor, a track size, resolving, by the processor, and intrinsic track size, and maximizing, by the processor, the intrinsic track size. Further, identifying parameters of the one or more horizontal tracks and the one or more vertical tracks further includes identifying an x2 value, where x2 is the sum of an x value and a width value. The width value is based on a width dimension of the container and the x value is based on a width dimension of the digital object, and identifying a y2 value, where y2 is the sum of a y value and a height value. The height value is based on a height dimension of the container and the y value is based on a height dimension of the digital object.

Referring now to FIG. 1A, a block diagram of a computing device is shown, according to some arrangements. The computing device 100 can be useful for practicing one or more arrangements of the present disclosure. As shown in FIG. 1A, in some arrangements, the computing device 100 includes a central processing unit 102, a main memory unit 104, a storage device 106, an installation device 108, a network interface 110, an input/output (I/O) controller 112, one or more display devices 114 (e.g., 114a-114n), a keyboard 116, and a pointing device 118 (e.g., a mouse). The storage device 106 can include, without limitation, an operating system (OS) 122, software 124 implemented via the OS 122, a software instance of a layout development platform (or tool) 126, and a GUI application 127. The layout development platform 126 can be one of the different types of software 124 implemented by the OS 122. The computing device 100 can also include additional optional elements, for example, such as a memory port, a bridge, one or more input/output devices 120 (e.g., 120a-120n), and cache memory in communication with the central processing unit 102.

In some arrangements, the central processing unit 102 can be any suitable logic circuitry that responds to and processes instructions fetched from the main memory unit 104. In some arrangements, the central processing unit 102 is provided by a microprocessor unit. For example, in some arrangements, the microprocessor unit can include one or more microprocessors manufactured by Intel Corporation of Mountain View, Calif., Motorola Corporation of Schaumburg, Ill., the ARM processor and TEGRA system on a chip (SoC) manufactured by Nvidia of Santa Clara, Calif., the POWER7 processor, those manufactured by International Business Machines of White Plains, N.Y., and/or by Advanced Micro Devices of Sunnyvale, Calif. The computing device 100 can be any of these processors, or any other suitable processor capable of operating as described herein. In various arrangements, the central processing unit 102 can utilize instruction level parallelism, thread level parallelism, different levels of cache, and/or multi-core processors. A multi-core processor can include two or more processing units on a single computing component. Examples of a multi-core processors include the AMD PHENOM IIX2, INTEL CORE i5 and INTEL CORE i7.

In some arrangements, the main memory unit 104 can include one or more memory chips capable of storing data and allowing any storage location to be directly accessed by the central processing unit 102. In some arrangements, the main memory unit 104 can be volatile and faster than the storage device 106. In various arrangements, the main memory unit 104 can be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), and/or Extreme Data Rate DRAM (XDR DRAM). In some arrangements, the main memory 104 or the storage device 106 can be non-volatile memory, for example, such as non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), and/or Millipede memory. The main memory 104 can be any of the above described memory chips, or any other available memory chips capable of operating as described herein. In some arrangements, the central processing unit 102 communicates with the main memory unit 104 via a system bus 128 (described in more detail herein). In other arrangements, the central processing unit 102 can communicate directly with the main memory unit 104 via a memory port.

In some arrangements, the central processing unit 102 can communicate directly with cache memory via a secondary bus, sometimes referred to as a backside bus. In other arrangements, the central processing unit 102 can communicate with cache memory using the system bus 128. Cache memory typically has a faster response time than the main memory unit 104, and is typically provided by SRAM, BSRAM, or EDRAM. In some arrangements, the central processing unit 102 communicates with various I/O devices 120 via a local system bus (e.g., the system bus 128). Various buses can be used to connect the central processing unit 102 to any of the I/O devices 120, including a PCI bus, a PCI-X bus, or a PCI-Express bus, or a NuBus. In arrangements in which the I/O devices 120 include a video display device 114, the central processing unit 102 can use an Advanced Graphics Port (AGP) to communicate with the display device 114 or the I/O controller 112 for the display device 114.

In various arrangements, a wide variety of I/O devices 120a-120n can be included in the computing device 100. For example, in various arrangements, the input devices of the I/O devices 120a-n can include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, and/or other sensors. In various arrangements, the output devices of the I/O devices 120a-n can include, for example, video displays, graphical displays, speakers, headphones, inkjet printers, laser printers, and/or 3D printers.

In some arrangements, I/O devices 120a-120n can include a combination of multiple input or output devices, such as, for example, Microsoft KINECT, Nintendo Wiimote for the WII, Nintendo WII U GAMEPAD, Apple IPHONE, Android based smart phones, and/or the like. In some arrangements, some of the I/O devices 120a-120n can allow gesture recognition inputs through a combination of some of the inputs and outputs. In some arrangements, some of the I/O devices 120a-120n can provide for facial recognition, which can be utilized as an input for different purposes including authentication and other commands. In some arrangements, some of the I/O devices 120a-120n can provide for voice recognition and inputs, such as, for example, Microsoft KINECT, SIRI for IPHONE by Apple, Google Now or Google Voice Search, and/or the like.

In some arrangements, additional I/O devices 120a-120n can have both input and output capabilities, including, for example, haptic feedback devices, touchscreen displays, multi-touch displays, and/or the like. Touchscreen, multi-touch displays, touchpads, touch mice, or other touch sensing devices can use different technologies to sense touch, including, for example, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), force-based sensing technologies, and/or the like. Some multi-touch devices can allow two or more contact points with the surface, allowing advanced functionality including, for example, pinch, spread, rotate, scroll, and/or other gestures. Some touchscreen devices, including, for example, Microsoft PIXELSENSE and Multi-Touch Collaboration Wall, can have larger surfaces, such as on a table-top or on a wall, and can also interact with other electronic devices. In some arrangements, some of the I/O devices 120a-120n, display devices 114a-114n, or group of devices can be augment reality devices. In some arrangements, the I/O devices (e.g., keyboard 116, pointing device 118, display devices 114, and/or I/O devices 120) can be controlled by the I/O controller 112. In some arrangements, an I/O device can also provide storage and/or an installation medium (e.g., installation device 108) for the computing device 100. In still other arrangements, the computing device 100 can provide USB connections to receive handheld USB storage devices. In further arrangements, an I/O device 120 can be a bridge between the system bus 128 and an external communication bus, for example, such as a USB bus, a SCSI bus, a FireWire bus, an Ethernet bus, a Gigabit Ethernet bus, a Fibre Channel bus, a Thunderbolt bus, and/or the like.

In some arrangements, the display devices 114a-114n can be connected to the I/O controller 112. In various arrangements, the display devices 114a-114n can include, for example, a liquid crystal display (LCD), a thin film transistor LCD (TFT-LCD), a blue phase LCD, an electronic papers (e-ink) display, a flexible display, a light emitting diode display (LED), a digital light processing (DLP) display, a liquid crystal on silicon (LCOS) display, an organic light-emitting diode (OLED) display, an active-matrix organic light-emitting diode (AMOLED) display, a liquid crystal laser display, a time-multiplexed optical shutter (TMOS) display, a 3D or stereoscopic display, and/or the like. Examples of 3D displays can include, for example, stereoscopy, polarization filters, active shutters, autostereoscopy, and/or the like. Display devices 114a-114n can also include a head-mounted display (HMD). In some arrangements, display devices 114a-114n or the corresponding I/O controllers 112 can be controlled through or have hardware support for OPENGL, DIRECTX API, and/or other graphics libraries.

In some arrangements, the computing device 100 can include or connect to multiple display devices 114a-114n, which each can be of the same or different type and/or form. As such, any of the I/O devices 120a-120n and/or the I/O controller 112 can include any type and/or form of suitable hardware, software, or combination of hardware and software to support, enable or provide for the connection and use of multiple display devices 114a-114n by the computing device 100. For example, the computing device 100 can include any type and/or form of video adapter, video card, driver, and/or library to interface, communicate, connect or otherwise use the display devices 114a-114n. In one arrangement, a video adapter can include multiple connectors to interface to multiple display devices 114a-114n. In other arrangements, the computing device 100 can include multiple video adapters, with each video adapter connected to one or more of the display devices 114a-114n. In some arrangements, any portion of the operating system 122 of the computing device 100 can be configured for using multiple displays 114a-114n. In other arrangements, one or more of the display devices 114a-114n can be provided by one or more other computing devices connected to the computing device 100, via a network. In some arrangements software can be designed and constructed to use another computer's display device as a second display device 114a for the computing device 100. For example, in one arrangement, an Apple iPad can connect to a computing device 100 and use the display of the computing device 100 as an additional display screen that can be used as an extended desktop. One of ordinarily skill in the art will recognize and appreciate the various ways and arrangements that a computing device 100 can be configured to have multiple display devices 114a-114n.

In some arrangements, the storage device 106 (e.g. one or more hard disk drives or redundant arrays of independent disks) can store the operating system 122, and/or other related software, and can store application software programs such as any program related to the software instance of the layout development platform 126. Examples of the storage device 106 can include hard disk drive (HDD), optical drive including CD drive, DVD drive, and/or BLU-RAY drive, solid-state drive (SSD), USB flash drive, and/or any other suitable device for storing data. Some storage devices 106 can include multiple volatile and non-volatile memories, such as, for example, solid state hybrid drives that combine hard disks with solid state cache. Some storage devices 106 can include non-volatile, mutable, and/or read-only. Some storage devices 106 can be internal and can connect to the computing device 100 via the bus 128. Some storage devices 106 can be external and can be connect to the computing device 100 via an I/O device 120 that provides an external bus. Some storage devices 106 can connect to the computing device 100 via the network interface 110 over a network, such as, for example, the Remote Disk for MACBOOK AIR by Apple. Some computing devices 100 cannot require a non-volatile storage device 106 and can be thin clients or zero clients. Some storage devices 106 can also be used as an installation device 108, and can be suitable for installing software and programs. Additionally, the operating system and the software can be run from a bootable medium, for example, such as a bootable CD (e.g. KNOPPIX), which can be a bootable CD for GNU/Linux that is available as a GNU/Linux distribution from knoppix.net.

In some arrangements, the computing device 100 can also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform can facilitate installation of software on the computing device 100. An application distribution platform can include a repository of applications on a server or a cloud, which the computing device 100 can access over a network (e.g., the Internet). An application distribution platform can include application developed and provided by various developers. A user of the computing device 100 can select, purchase, and/or download an application via the application distribution platform.

In some arrangements, the computing device 100 can include the network interface 110 to interface to a network through a variety of connections including, but not limited to, for example, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, and/or some combination of any or all of the above. Connections can be established using a variety of communication protocols (e.g., TCP/IP, Ethernet, ARCNET, SONET, SDH, Fiber Distributed Data Interface (FDDI), IEEE 802.11/b/g/n/ac CDMA, GSM, WiMax and direct asynchronous connections). In one arrangement, the computing device 100 communicates with other computing devices via any type and/or form of gateway or tunneling protocol (e.g. Secure Socket Layer (SSL) or Transport Layer Security (TLS), or the Citrix Gateway Protocol manufactured by Citrix Systems, Inc. of Ft. Lauderdale, Fla.). In some arrangements, the network interface 110 can include, for example, a built-in network adapter, network interface card, PCMCIA network card, EXPRESSCARD network card, card bus network adapter, wireless network adapter, USB network adapter, modem, and/or any other suitable device for interfacing the computing device 100 to any type of network capable of communication and performing the operations described herein.

In some arrangements, the computing device 100 can operate under the control of the operating system 122, which controls scheduling of tasks and access to system resources. In various arrangements, the computing device 100 can run any suitable operating system 122, such as, for example, any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, and/or any other suitable operating system capable of running on the computing device 100 and performing the operations described herein. Some examples of operating systems 122 include, but are not limited to: WINDOWS 2000, WINDOWS Server 2012, WINDOWS CE, WINDOWS Phone, WINDOWS XP, WINDOWS VISTA, WINDOWS 7, WINDOWS RT, WINDOWS 8, WINDOWS 10, and/or the like, all of which are manufactured by Microsoft Corporation of Redmond, Wash.; MAC OS and iOS, manufactured by Apple, Inc. of Cupertino, Calif.; Linux, a freely-available operating system, e.g. Linux Mint distribution ("distro") or Ubuntu, distributed by Canonical Ltd. of London, United Kingdom; Unix or other Unix-like derivative operating systems; and Android, designed by Google, of Mountain View, Calif., but can include others. Some operating systems 122, including, for example, the CHROME OS by Google, can be used on zero clients or thin clients (e.g., CHROMEBOOKS).

In various arrangements, the computing device 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, and/or any other suitable type and/or form of computing, telecommunications, or media device that is capable of communication. The computing device 100 has sufficient processor power and memory capacity to perform the operations described herein. In some arrangements, the computing device 100 can have different processors, operating systems, and input devices consistent with the device.

In some arrangements, the computing device 100 can be a gaming system. For example, the computing device 100 can include a PLAYSTATION (1, 2, 3, 4, and/or the like), a PERSONAL PLAYSTATION PORTABLE (PSP), and/or a PLAYSTATION VITA device manufactured by the Sony Corporation of Tokyo, Japan, a NINTENDO DS, NINTENDO 3DS, NINTENDO WII, NINTENDO WII U, and/or Nintendo Switch device manufactured by Nintendo Co., Ltd., of Kyoto, Japan, an XBOX 360, XBOX one, and/or the like manufactured by the Microsoft Corporation of Redmond, Wash., and/or the like.

In some arrangements, the computing device 100 can be a digital audio player such as the Apple IPOD, IPOD Touch, and IPOD NANO lines of devices, manufactured by Apple Computer of Cupertino, Calif. Some digital audio players can have other functionality, including, for example, a gaming system or any functionality made available by an application from a digital application distribution platform. For example, the IPOD Touch can access the Apple App Store. In some arrangements, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and/or .mp4 MPEG-4 (H.264/MPEG-4 AVC) video file formats.

In some arrangements, the computing device 100 can be a tablet, for example, such as the IPAD line of devices by Apple; GALAXY TAB family of devices by Samsung; KINDLE FIRE, by Amazon.com, Inc. of Seattle, Wash.; and/or the like. In other arrangements, the computing device 100 can be a eBook reader, such as, for example, the KINDLE family of devices by Amazon.com, or the NOOK family of devices by Barnes & Noble, Inc. of New York City, N.Y.

While some non-limiting examples of various computing devices 100 and components thereof have been described herein, the present disclosure is not limited to. For example, other suitable computing devices and/or components thereof relating to one or more of the various aspects of the operating environments and components described above in the context of the systems and methods disclosed herein are contemplated, as will be apparent to those having ordinary skill in the art.

Figure 1B:
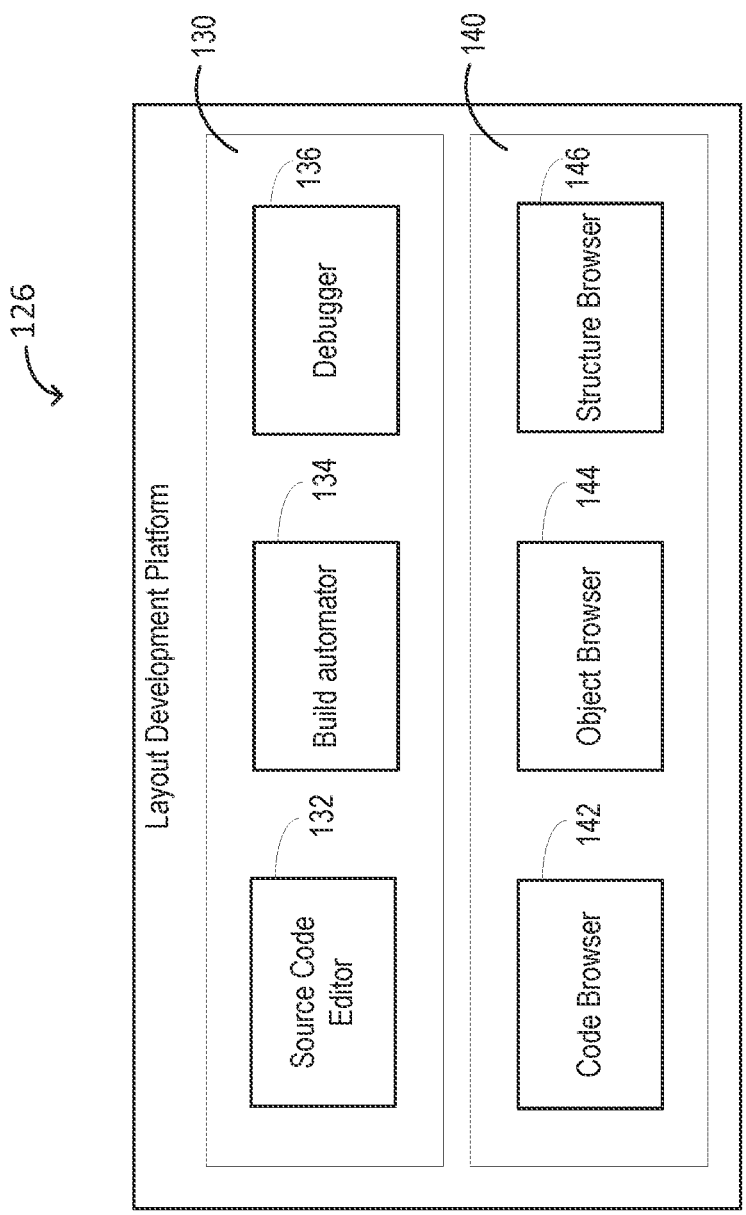
FIG. 1B is a block diagram depicting a layout development platform that can be used to facilitate a developer in developing their webpage layout, according to some arrangements.

Referring now to FIG. 1B, a block diagram depicting the layout development platform 126 of FIG. 1A is shown in more detail, according to some arrangements. In some arrangements, the layout development platform 126 is a software program executed on the computing device 100 via OS 122. In other arrangements, the layout development platform 126 can be hosted on a cloud computing platform including one or more controllers, servers, and/or any other suitable computing devices that can be accessed by the computing device 100 over a network (e.g., the Internet) via the network interface 110. In some arrangements, the layout development platform 126 can include or be a part of a software development environment to facilitate software developers in building software applications for various different operating systems. For example, in some arrangements, the layout development platform 126 can be part of an integrated development environment (IDE), such as any of the RAD Studio product lines developed by Embarcadero Technologies. However, in other arrangements, the layout development platform 126 can be a separate design tool (e.g., computer program) that facilitates the development of web services for various computer applications (e.g., client applications, desktop applications, mobile applications, and/or the like) for various different computer programs, applications, operating systems, devices, and/or interfaces.

For example, in some arrangements, the layout development platform 126 can facilitate software developers in designing a computer application (e.g., a client application, a Graphical User Interface (GUI), and/or the like) or web services for the computer application. In some arrangements, the layout development platform 126 can facilitate in the design of the computer application for a particular type of computing device (e.g., a particular type of operating system) or for various different computing devices (e.g., various different operating systems). For example, in some arrangements, the layout development platform 126 can include virtualization software to virtually simulate different operating systems, computing devices, and/or platforms, so that the software developer can view and design computer applications having consistent look and feel across various devices, operating systems, and platforms.

In some arrangements, the layout development platform 126 can generate a plurality of versions of the computer application so that each version is tailored to execute or run on a different type of computing device, operating system, or platform. In various arrangements, such different versions can be created automatically or under control (e.g., user input) of the software developer. Accordingly, in some arrangements, a software developer can utilize the layout development platform 126 to design an application to run on more than one type of device, operating system, or platform.

For a non-limiting example, the layout development platform 126 can facilitate in the design of the computer application to execute on a desktop computer running a Windows operating system and a smart phone running an Android operating system. However, in other arrangements, other types of devices and operating systems can be employed, for example, such as any of the devices and/or operating systems described above with reference to FIG. 1A.

In more detail, as shown in FIG. 1B, the layout development platform 126 can include a code generator 130, and a developer interface 140 according to some arrangements. In some arrangements, the code generator 130 facilitates in the generation of software code and software builds for a computer application or web services for the computer application. For example, in some arrangements, the code generator 130 can include a source code editor 132. In some arrangements, the source code editor 132 can be a textual-based computer program configured to enable software developers to read, write, and edit the source code of a computer application, web services for the computer application, or any other suitable computer program. In some arrangements, the source code editor 132 can include features that simplify the generation of source codes, such as, for example, syntax checking, syntax highlighting, autocomplete, brace matching, and/or the like. In some arrangements, the source code editor 132 can include a structure editor that enables software developers to edit the structure of the source code using a syntax tree.

In some arrangements, the code generator 130 can further include a build automator 134, a debugger 136, and/or the like. In some arrangements, the build automator 134 facilitates the creation of a software build, including, for example, compiling code, packaging code, running automated tests, and/or the like. In some arrangements, the debugger 136 facilitates testing and debugging of the code, for example, by enabling various test functions such as querying processors, resolving symbols, interpreting expressions, single-stepping, program animation, breaking, tracking, verifying, reverse debugging, source-level debugging, symbolic debugging, low-level debugging, machine-language debugging, and/or the like. However, in other arrangements, the code generator 130 can include any number of suitable modules or functions to facilitate in the generation, build, and/or debugging of the source code running the computer application or web services for the computer application.

In some arrangements, the developer interface 140 can provide an interface (e.g., GUI) to a software developer to interact with various graphics, components, and/or controls to develop the computer application or web services for the computer application. For example, in some arrangements, the developer can utilize the pointing device 118 to select and position various graphical and non-graphical objects into a design area (or design surface) of a visual designer (e.g., a 2-dimensional and/or 3-dimensional designer, editor, and/or the like) for generating a GUI running the computer application via the developer interface 140. In some arrangements, the design area can include, for example, a window, form, card, pane, frame, 3-dimensional design area or surface, and/or the like, such that the various graphics, components, and/or controls arranged on the design area are shown at runtime as they would appear on a display window, mobile display screen, subsets (e.g., controls, portions of a window or screen, or the like) of a larger UI, or the like.

In some arrangements, the developer can utilize the pointing device 118 to select and position various web services components (or web services objects) and other objects into a design area (or design surface) of the developer interface 140 for implementing various web services via the developer interface 140. In this case, the design area can include a data module or other design surface that is similar to the design area for generating the GUI, except the data module is independent from any particular display window, mobile display screen, or the like. Instead, the data module maps the web services components arranged thereon to a particular endpoint (e.g., URL), such that at runtime, incoming requests for web services at the particular endpoint are mapped to the web services component(s) to handle the incoming requests according to the configured properties of the web services component(s) and other objects. For example, in some arrangements, the developer can arrange one or more web services components (and other linked objects as needed or desired) on the data module to map the web services components to the particular endpoint (e.g., URL), and can configure one or more properties of the web services components to enable allowable actions (e.g., HTTP verbs) and other parameters in the incoming request that are supported by the web services components.

For example, in some arrangements, the developer interface 140 can include a code browser 142 (or code viewer), an object browser 144 (or object viewer), and a structure browser 146 (or structure viewer). In some arrangements, the code browser 142 enables software developers to browse, navigate, and visualize the source code for the computer application or web services. For example, the code browser 142 presents the source code in a window or section of the developer interface 140 to enable software developers to browse, navigate, and modify the source code. In some arrangements, the object browser 144 enables software developers to visualize the hierarchy of the objects (e.g., graphics, components, and/or controls) and web services components for the computer application or web services, including properties and events as well as other pertinent information that conveys characteristics of objects and web services components. In some arrangements, the object browser also provides an interface in a window or section of the developer interface 140 to enable interaction with the objects and web services components and/or their properties. In some arrangements, the structure browser 146 enables software developers to visualize the structure of the source code by showing the code's classes, attributes, operations, and relationships among objects and web services components in a class diagram (e.g., a tree diagram) that describes the parent-child relationship of the objects, web services components, and controls with respect to other objects, web services components, and controls.

In some arrangements, the layout development platform 126 can include one or more libraries or databases (e.g., stored in a storage device) of various predefined, customized, and/or imported objects and web services components that can be used for creating the computer application (e.g., a GUI) or web services. These objects and web services components can have various properties, each of the properties having a simplistic value (e.g., text or number) or a complex value (e.g., sub-values) that define its own set of properties (e.g., sub-properties, nested properties, and/or the like). Further, in some arrangements, each of the properties have a default or original property value that can be modified or changed by software developers as needed or desired to configure the corresponding object or web services component. For example, in some arrangements, custom created and imported objects and web services components can be added to the databases (e.g., libraries) to be retrieved for later use, and can be stored with original or default property values that define the custom created and imported objects and web services components. Accordingly, in various arrangements, each of the objects and web services components can be defined by one or more properties, and the developer can configure each of the objects and web services components by modifying or configuring the properties via the developer interface 140 (e.g., the object browser 144), instead of having to write manual code for each implemented method (e.g., HTTP method).

In some arrangements, the libraries or databases can include various different types of predefined web services components corresponding to various implementations of common web services scenarios. For example, the predefined web services components can include a file access web services component for accessing (e.g., reading and writing) files in a file system (e.g., folder) or other web services entity or resource, a database access web services component for accessing data in a database or other web services entity or resource (e.g., data set, table, or the like), and/or the like. In some arrangements, the developer can extend any of the predefined web services components to generate customized or modified web services components, such that different (or additional) web services can be implemented within the same architecture and framework described herein. In some arrangements, the customized or modified web services components can be added to the libraries or databases, such that the libraries or databases include various predefined and extended web services components that can be retrieved for later use.

Figure 2:
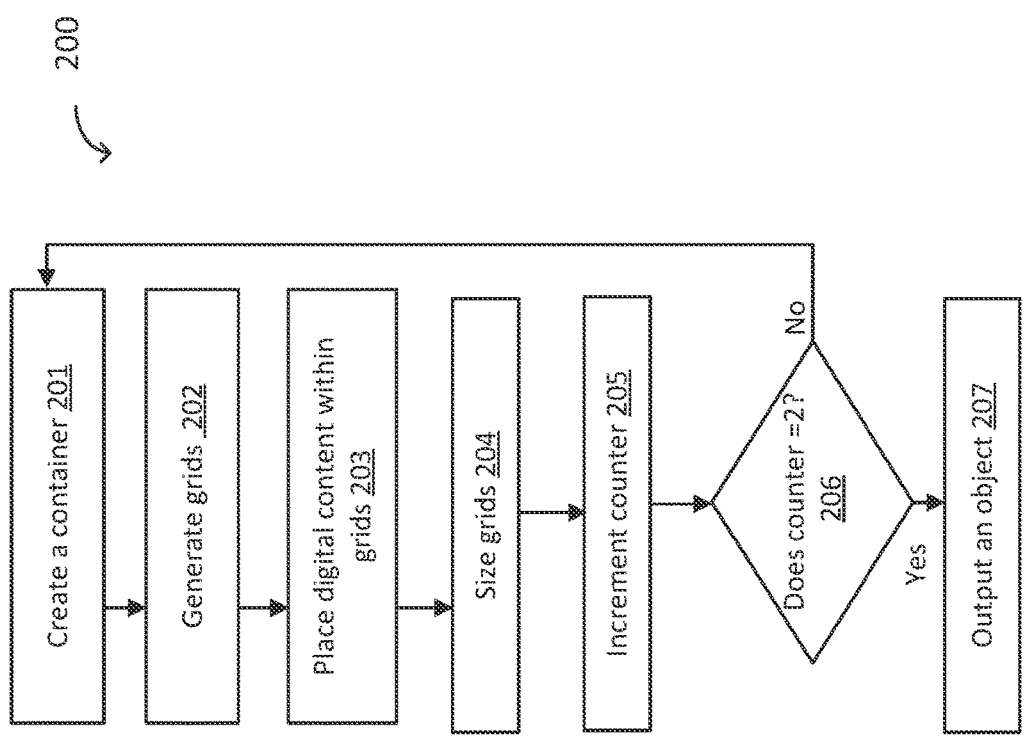
FIG. 2 is a flow chart of a method of layout design that can accommodate SVG placement, according to some arrangements.

FIG. 2 is a flow chart of a method 200 of implementing a layout design, according to some arrangements.

As shown in block 201, a container is created to display a graphic. Creating a container used to display a graphic includes receiving user input, the user input received via keyboards 116, pointing device 118, and/or I/O devices 120a-n. The container can be generated according to the user input.

A container can be an object that houses other objects. In some arrangements, a parent object can be a portion of code that defines one or more portions of the container object. In some arrangements, a child object can be a portion of code that can further define one or more portions the container object. The child object can inherit some of the properties of the parent object making the child object related to the parent object. The structure browser 146 can enable the webpage developers to visualize the structure of the code. In other words, the parent-child relationships of the container can be traced.

An example of a child inheriting some limitations of the parent object includes the child object defining horizontal and vertical tracks according to the limitations of the container defined in the parent object. Horizontal and vertical tracks will be discussed herein.

Each child of the parent can be defined uniquely such that the grids, resulting from the placement of the horizontal tracks and vertical tracks, have their own style. The styles of the grids can be defined by a user. A user can define user preferences in the form of styles via the keyboard 116, pointing device 118 and/or I/O devices 120a-n. In alternate arrangements, the styles of the grids can be determined using an algorithm via the central processing unit 102, or any conventional means of determining the style of the grid. For example, in response to a lack of a user-defined style, default styles can be predetermined by developers and implemented via the central processing unit 102. As discussed herein, the layout development platform 126 can include one or more libraries or databases of various predefined and/or imported objects.

The style can define the characteristics of the grid, the content in the grid, and so on. For example, the style can define how the content is aligned in the grid. For example, the alignment of text in a table can be considered similar to aligning content in a grid. Alternatively, the style can define how the grid is aligned in the container. For example, the alignment of a grid in a table can be considered similar to aligning a grid in a container. In other words, the digital content and/or grids can be modified by alignment preferences. In some arrangements, the alignment preferences can be received by a central processing unit 102 and determined by a user via the keyboard 116, pointing device 118 and/or I/O devices 120*a-n*. In other arrangements, the alignment preferences can be determined using an algorithm via the central processing unit 102, or any conventional means of determining alignment. For example, in response to a lack of a user-defined alignment preference, default alignment can be predetermined by developers and implemented via the central processing unit 102. As discussed herein, the layout development platform 126 can include one or more libraries or databases of various predefined and/or imported objects.

Figure 4A:
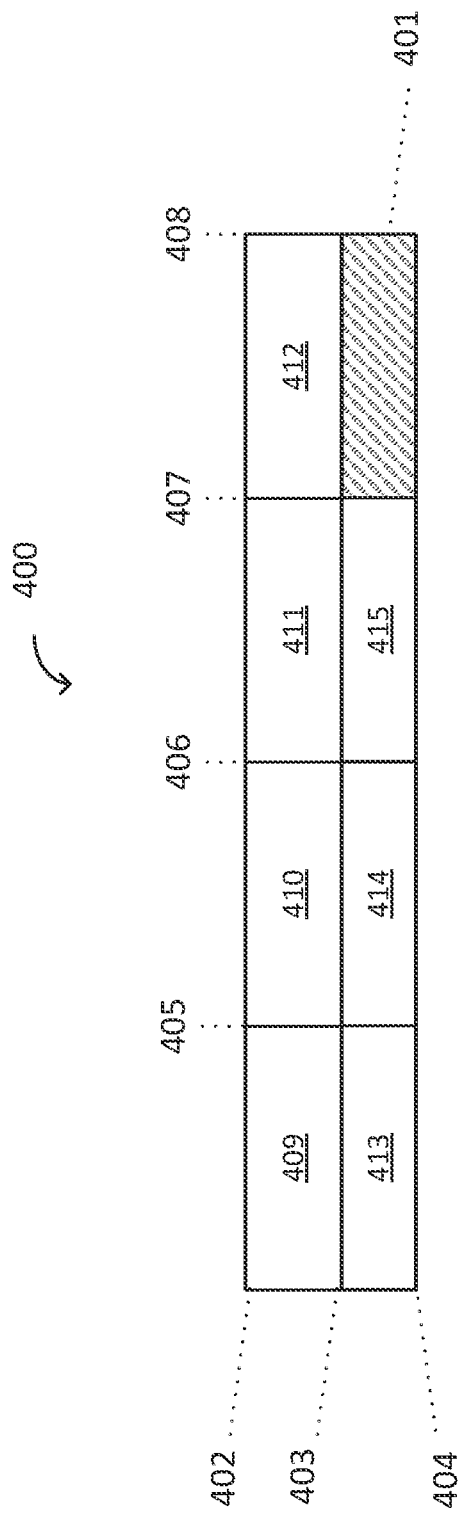
FIG. 4A is an example container housing horizontal tracks and vertical tracks, according to some arrangements.
Figure 4B:
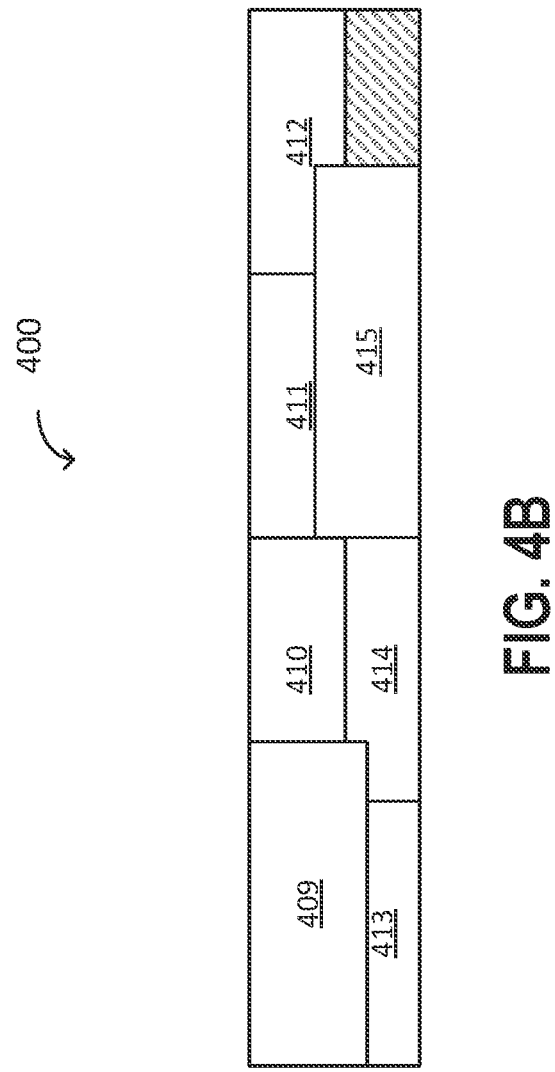
FIG. 4B is a diagram of an example container housing horizontal tracks and vertical tracks with overlapping grids, according to some arrangements.
Figure 4D:
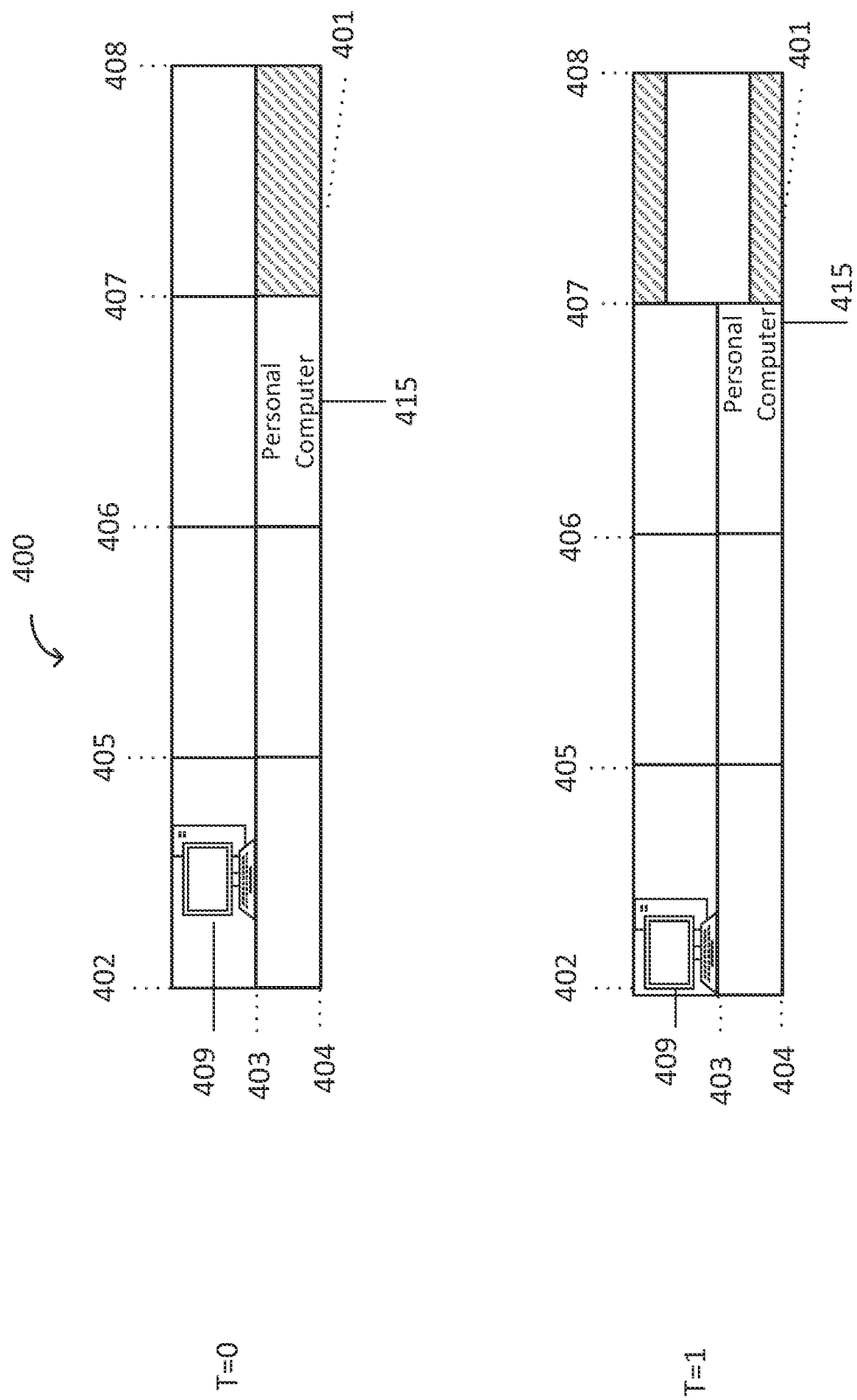
FIG. 4D is a diagram of an example container housing aligned digital content and grids, according to some arrangements.

One example arrangement of a table-like object created by horizontal tracks and vertical tracks with aligned digital content and grids is illustrated in FIG. 4D herein.

Further, the style can define overlapping digital content and/or overlapping grids. For example, grids can be placed such that the grids appear to overlap each other in the container. In other words, the digital content and/or grids can be modified by overlapping preferences. In some arrangements, the overlapping preferences can be received by a central processing unit 102 and determined by a user via the keyboard 116, pointing device 118 and/or I/O devices 120*a-n*. In other arrangements, the overlapping preferences can be determined using an algorithm via the central processing unit 102, or any conventional means of determining the overlap of content. For example, in response to a lack of a user-defined overlap, default overlap preferences can be predetermined by developers and implemented via the central processing unit 102. As discussed herein, the layout development platform 126 can include one or more libraries or databases of various predefined and/or imported objects.

One example arrangement of a table-like object created by horizontal tracks and vertical tracks with overlapping grids is illustrated in FIG. 4B herein. The overlapping of the grids can be controlled by a z-index property.

Additionally, content characteristics such as font, color, size, and so on can be defined in the style parameters.

As shown in block 202, grids can be created. A grid can be created from the intersection of horizontal tracks and vertical tracks, the horizontal tracks and vertical tracks being housed within the container. Grids can be created such that the container appears as a table. One example arrangement of a table-like object created by horizontal tracks and vertical tracks is illustrated in FIG. 4A herein.

The method 200 enables controlling of the horizontal tracks and vertical tracks such that both rows and columns can be positioned inside of the container. In some arrangements, a user can define the position of the horizontal tracks and vertical tracks within the container using the keyboard 116, pointing devices 118, and/or I/O devices 120*a-n*. In alternate arrangements, the position of the horizontal tracks and vertical tracks can be determined by an algorithm used by the central processing unit 102 or any conventional means of determining the placement of an object. For example, in response to a lack of a user-defined position, default positions can be predetermined by developers and implemented via the central processing unit 102. As discussed herein, the layout development platform 126 can include one or more libraries or databases of various predefined and/or imported objects.

For example, a fraction of the available space in the grid container can be used to determine the dimensions of the grids in the container. The central processing unit 102, in response to receiving a designated command such as but not limited to the "fr" command via keyboard 116, pointing device 118, and/or I/O devices 120*a-n*, can use the number of grids housed within the container to determine the size of each of the grids. For example, the code "grid-template-columns: 2 fr 1 fr 1 fr;" can generate three columns. The dimensions of the three columns in the grid depend on the unassigned space, or available space, in the container. The first column ("2 fr") is twice as big as the other two columns (each of which represented by "1 fr"). One example arrangement of a table-like objected created by vertical tracks as described herein is illustrated in FIG. 4C. Further, padding, or margins, can be used to create gaps between adjacent horizontal or vertical tracks.

As shown in block 203, digital content can be placed within the grids. Digital content can be text, graphics, multimedia, and so on. In some arrangements, a user can determine the placement of the content in the grids via a keyboard 116, a pointing device 118, and/or I/O devices 120*a-n*. In alternate arrangements, the position of the content can be determined using an algorithm via the central processing unit 102, or any conventional means of determining the position of content. For example, in response to a lack of a user-defined placement, default placements can be predetermined by developers and implemented via the central processing unit 102. As discussed herein, the layout development platform 126 can include one or more libraries or databases of various predefined and/or imported objects.

For example, the central processing unit 102 may create and place more horizontal and vertical tracks in response to the need for more grids. The digital content placed in the grids can be used by central processing unit 102 when the central processing unit 102 evaluates whether there is a need for more horizontal and vertical tracks. The size of the tallest item within the digital content can dictate how the central processing unit 102 defines the horizontal and vertical tracks. Alternatively, in response to the content exceeding the size of the container, the central processing unit 102 can create more horizontal and vertical tracks. In other words, in response to content placed outside of bounds of the container, the central processing unit 102 can create and place more grids to encompass the digital content.

As shown in block 204, in response to the content being placed inside the grids, the position of the tracks, and therefore the size of the grids can be adjusted.

As shown in block 205, a counter is incremented. The counter may be used in decision block 206. The decision in block 206 evaluates whether the content fits properly within the grid. In some circumstances, content can be placed but the content may not fit properly within the grid. A processor may determine that the content fits properly within the grid by evaluating the counter from block 205. When the counter reaches its maximum value, it may be assumed that the content fits properly within the grid. The counter maximum may be based on the number of grids. In other words, the more grids generated to contain content, the higher the counter maximum may be. In some arrangements, a grid may be generated such that digital objects may fit inside the grid. In other arrangements, a grid may be generated that contains a second grid such that digital content may further be organized using the various grids. The subsequent grid within a grid may be called a nested grid.

Figure 7:
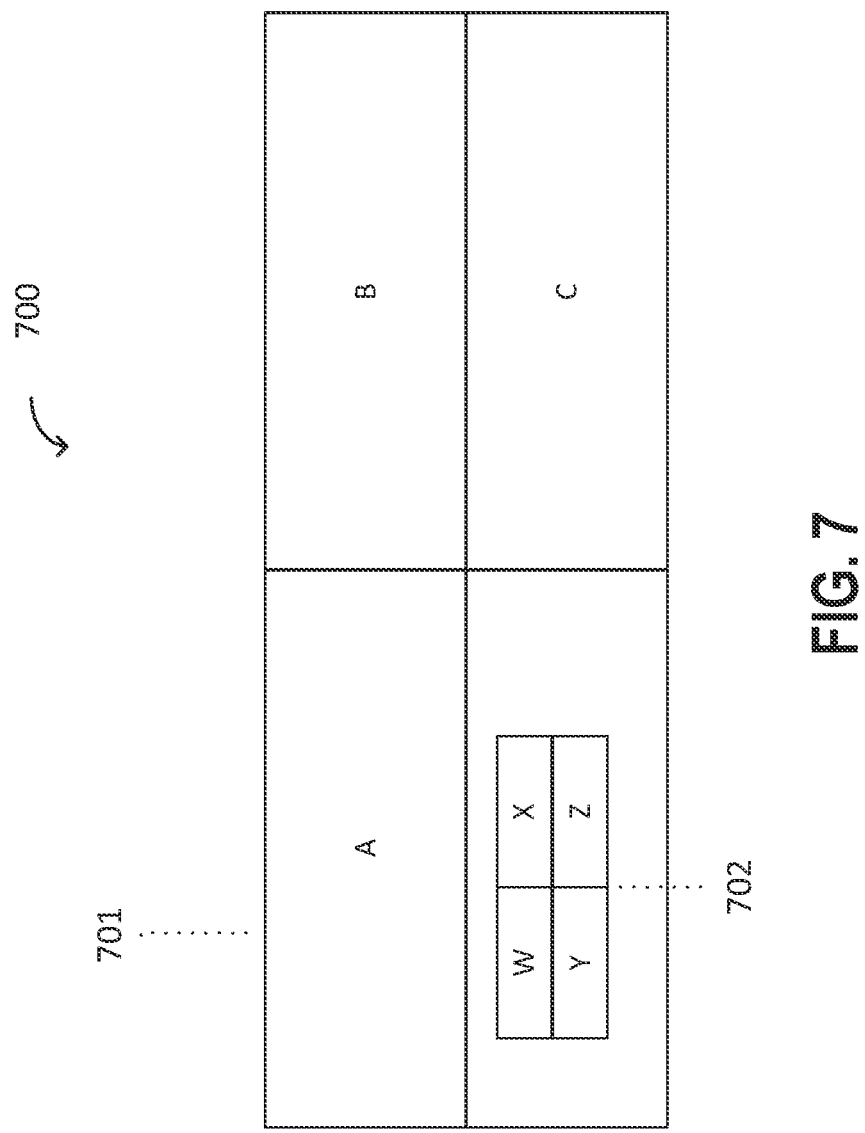
FIG. 7 is a diagram of an example of a nested grid, according to some arrangements.

Referring now to FIG. 7, a block diagram of an example nested grid 700 is shown, according to some arrangements. In a simplified example, grid 701 contains a nested grid 702 inside. Grid 701 organizes the digital content A, B and C. Nested grid 702 further organizes content such as W, X, Y and Z within grid 701.

Returning to FIG. 2, the algorithm used to fit the content properly in the grids may be run $2^n$ times, where n is the number of nested grids being fitted. Thus, when a developer is employing one grid, the decision block 206 assumes the grid, including the digital content within the grid, will be fit properly in the event the event the counter is equal to $2^1=2$ times. In other arrangements, in the event of one nested grid, the processor may continue creating grids and formatting the grids until the counter has reached $2^2=4$. In response to the counter not being at the expected value, i.e., $2^n$, the grid can be redrawn and resized, and the method repeated at block 201. In response to the content fitting properly within the grid, an object can be returned.

Figure 5:
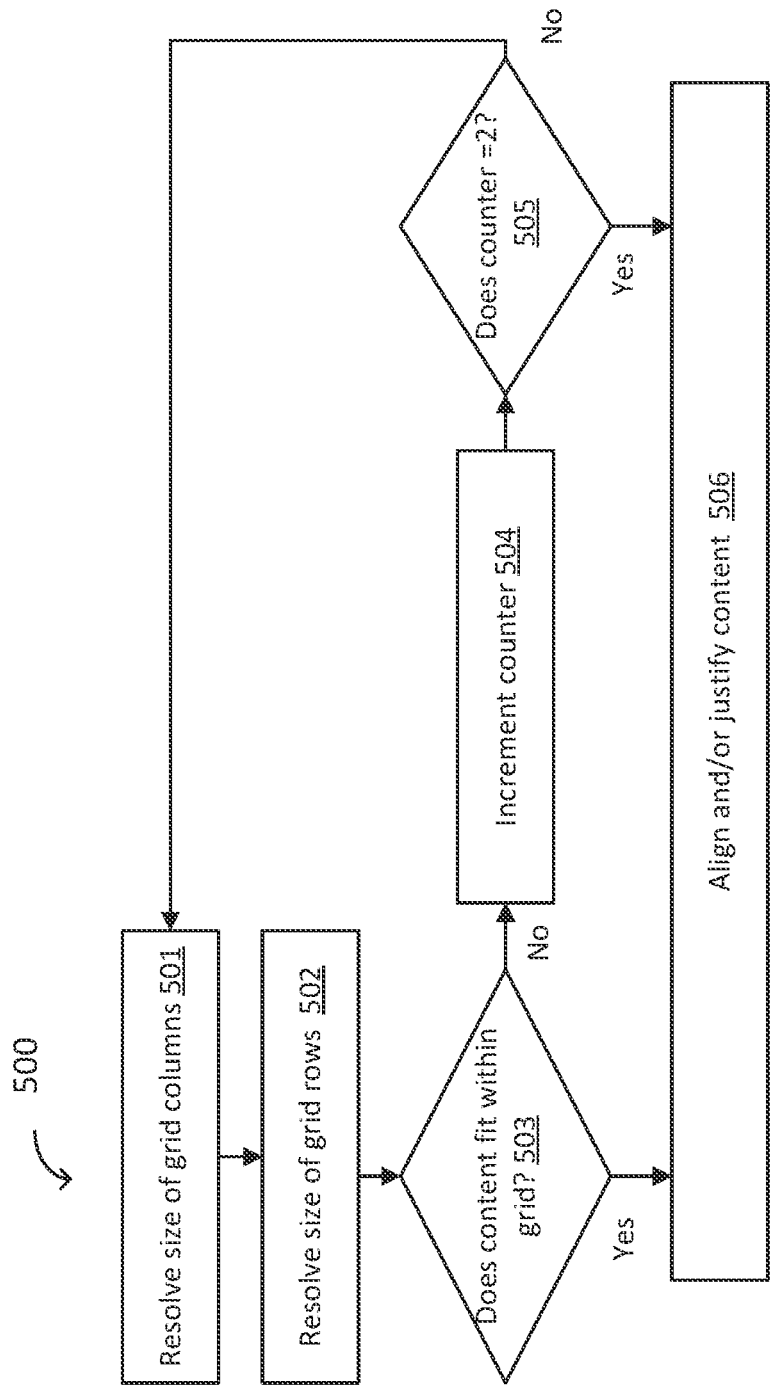
FIG. 5 is a flow chart of a method of the tracking sizing algorithm, according to some arrangements.
Figure 6:
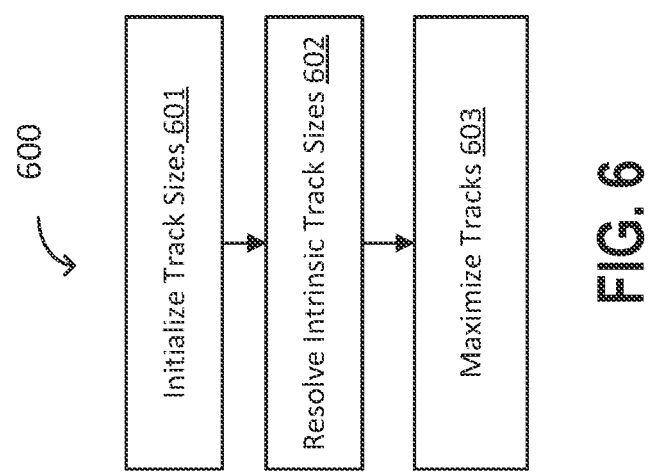
FIG. 6 is a flow chart of an example implementation of the track sizing algorithm, according to some arrangements.

In some arrangements, algorithms can be used to fit the digital content properly in the grid. For example, a track sizing algorithm can be implemented. FIGS. 5 and 6 discussed herein depict the method of the track sizing algorithm.

As shown in block 206, an object can be returned. The object can identify the parameters of the horizontal tracks and vertical tracks such that the position of the tracks relative to the fitted and properly placed content becomes known. In some arrangements, the returned object may define the parameters of the horizontal track, for example, by identifying an x2 value, where x2 is the sum of an x value and a width value. The x value can be defined by a width dimension of the placed digital content in the grid, and the width value can be defined by the width dimension of the container housing the grid. Similarly, the returned object may define the parameters of the vertical track, for example, by identifying a y2 value, where y2 is the sum of a y value and a height value. The y value can be defined by the height dimension of the placed digital content in the grid, and the height value can be defined by the height dimension of the container housing the grid. In some arrangements, the returned object can be displayed to a user.

Figure 3:
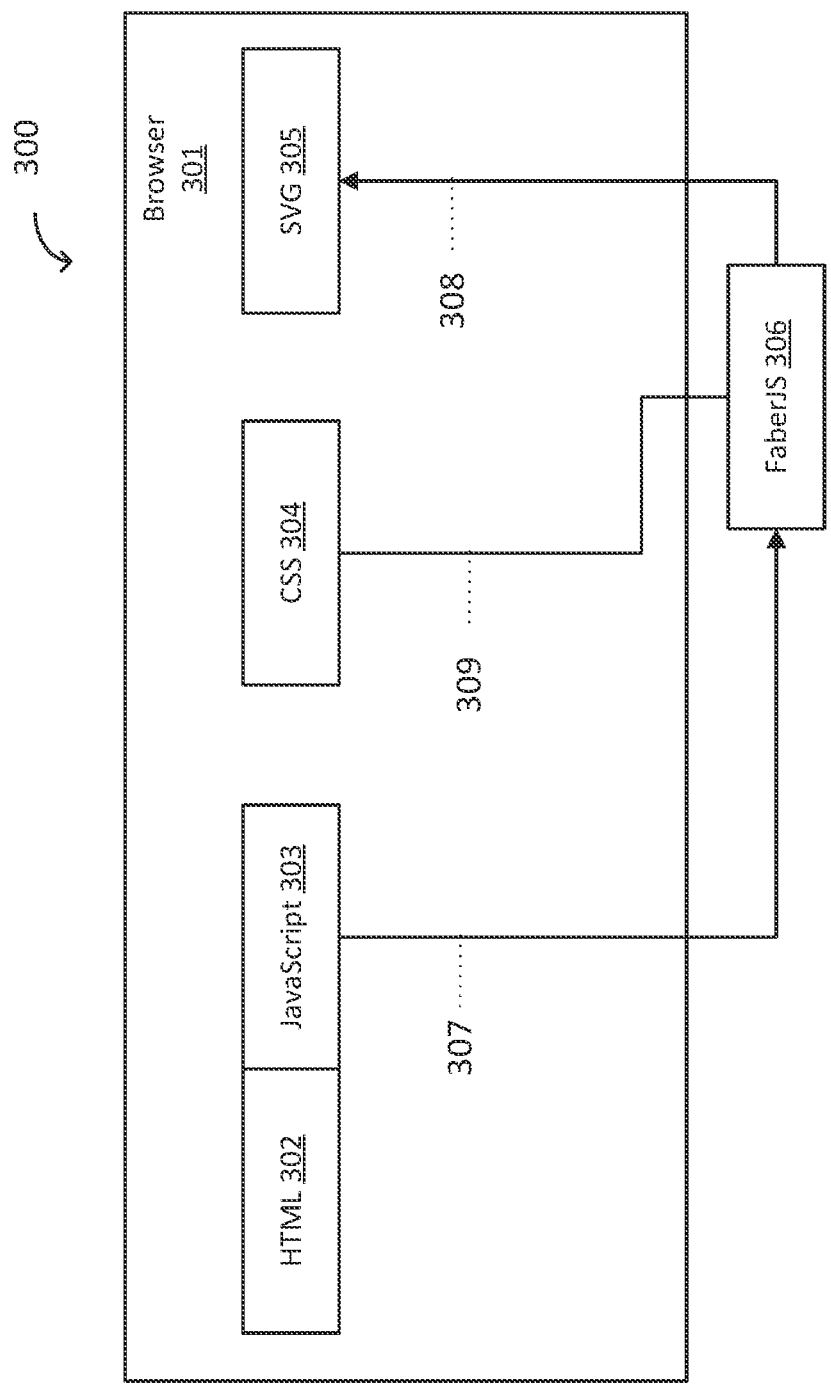
FIG. 3 is a diagram of a layout design that can accommodate SVG placement, according to some arrangements.

FIG. 3 is a diagram of a layout design 300, according to some arrangements.

A web browser 301 can be accessed by a user device. The web browser can be coded such that the web browser displays information, pictures, or data of the like that is of interest to a user. The web browser 301 can be coded via any language platforms such as HTML 302 or JavaScript 303.

A layout design tool that allows developers to position graphics such as SVG can operate in a library on a user device. One example of a layout design tool that allows developers to position graphics such as SVG is FaberJS 306. In some arrangements, the layout design tool that allows developers to position graphics such as SVG can operate using an Application Program Interface ("API").

As discussed herein, the position of SVG objects can be modified by the present layout design tool. In some arrangements, the layout design tool that allows developers to position graphics such as SVG can be coded in a web-based language such as but not limited to a programming language capable of implementing complex features on web-pages. This web-based language can be considered an input 307 into the layout design tool that allows developers to position graphics such as SVG. In some arrangements, the web-based language such as but not limited to a programming language capable of implementing complex features on web-pages can be JavaScript 303. The position of SVG 305 objects can be considered an output 308 of the layout design tool that allows developers to position graphics such as SVG.

Traditional layout design tools can position objects on the web browser. As discussed herein, one example of a layout design tool that positions objects on a web browser can be CSS. However, CSS is not capable of positioning such web objects as SVG. The present layout design tool that allows developers to position graphics such as SVG can leverage standards from CSS. Accordingly, CSS 304 can be considered an input 309 to the layout design tool that allows developers to position graphics such as SVG. For example, CSS syntax can be used when running the layout design tool that allows developers to position graphics such as SVG.

FIG. 4A is a diagram of an example container 400 housing horizontal tracks and vertical tracks, according to some arrangements.

The container 401 is an object created to house the horizontal and vertical tracks. For example, horizontal tracks can be indicated by 402, 403, and 404. The horizontal tracks 402-404 can be used to create two rows. Further, vertical tracks can be indicated by 402, 405, 406, 407, and 408. The vertical tracks 402, 405-408 can be used to create four columns. The horizontal tracks and vertical tracks can be positioned such that the tracks intersect, creating rectangles, or grids, inside of the container. Subsequently, content can be placed inside of the container. For example, content 409-415 can be placed in grids resulting from the horizontal tracks 402-404 and vertical tracks 402, 405-408.

FIG. 4B is a diagram of an example container 400 housing horizontal tracks and vertical tracks with overlapping grids, according to some arrangements. The z-index property can be used to assign depths to grids in the container. In some arrangements, the z-index property can be received by the central processing unit 102 via user input from the keyboard 116, pointing device 118 and/or I/O devices 120a-n. In other arrangements, the z-index property can be determined by the central processing unit 102. For example, in response to a lack of a user-defined z-index, default z-indices can be predetermined by developers and implemented via the central processing unit 102. As discussed herein, the layout development platform 126 can include one or more libraries or databases of various predefined and/or imported objects. The differences in depth can cause grids to appear as if they overlap other grids. For example, the grid containing content 409 appears to overlap the grids containing objects 410, 413 and 414. Similarly, the grid containing content 415 appears to overlap the grids containing objects 411 and 412.

FIG. 4C is a diagram of an example container 400 housing partitioned vertical tracks, according to some arrangements. At time T=0, the unassigned space in container 401 is evaluated by the central processing unit 102. As shown, all of the space in container 401 is unassigned space. In response to the central processing unit 102 receiving the command "grid-template-columns: 2 fr 1 fr 1 fr;", the central processing unit 102 allocates the available space in container 401. At time T=1, the container has been divided such that vertical tracks 402, 405, 406 and 407 partition the container. The grid created by vertical tracks 402 and 405 is twice the size of the other two grids.

FIG. 4D is a diagram of an example container 400 housing aligned digital content and grids, according to some arrangements. At time T=0, a digital content graphic 409 is placed in the grid between vertical tracks 402 and 405, and horizontal tracks 402 and 403. Similarly, at time T=0, digital content text 415 is placed in the grid between vertical tracks 406 and 407, and horizontal tracks 403 and 404. At time T=1, the digital contents are modified by alignment preferences. In response to the alignment preferences, the central processing unit 102 can align the digital content graphic 409 to the left in the grid between vertical tracks 402 and 405, and horizontal tracks 402 and 403. Similarly, the digital content text 415 can be aligned to the right in the grid between vertical tracks 406 and 407, and horizontal tracks 403 and 404. Further, the grid that was between vertical tracks 407 and 408, and horizontal tracks 402 and 403 at time T=0 can be aligned such that it is placed by the central processing unit 102 in the center of the available space in container 401.

Referring to FIGS. 1-5, the method 500 is an example of the track sizing algorithm. As shown in block 501, the position of the vertical tracks, or the columns, within the container can be determined. In some arrangements, the position of the vertical tracks can be determine by the central processing unit 102. For example, the position of the vertical tracks can be determined by the central processing unit 102 via the command "fr" as discussed herein. In other arrangements, the position of the vertical tracks can be received by the central processing unit 102 via user input from the keyboard 116, pointing device 118 and/or I/O devices 120a-n.

As shown in block 502, the position of the horizontal tracks, or rows, within the container can be determined. In some arrangements, the position of the horizontal tracks can be determined by the central processing unit 102. In other arrangements, the position of the horizontal tracks can be received by the central processing unit 102 via user input from the keyboard 116, pointing device 118, and/or I/O devices 120a-n.

The decision in block 503 evaluates whether content can fit within the dimensions of the grid. The dimensions of the grid being determined by blocks 501 and 502. For example, in response to all of the edges of the content fully encompassed by the grids, the processing unit 102 can determine that the content fits inside the grid.

In response to the content not fitting within the grid, a counter is incremented, as shown in block 504. The decision in 505 evaluates whether the counter has reached the number the maximum predefined number. In some arrangements, the sizing of the columns and rows can be run twice. Thus, in response to the counter not reaching its maximum value, the method can repeat blocks 501 and 502 such that the columns and rows can be resized. The decision in block 505 evaluates whether the counter has reached the number two. In alternate arrangements, the number of times that the sizing of the columns and runs occurs can be modified.

In response to the content fitting within the grid in block 503, or the counter reaching its maximum value in block 505, the central processing unit 102 aligns and/or justifies the content as shown in block 506. For example, the content can be aligned with respect to the vertical and/or horizontal tracks. Thus, the grids are sized and the content is placed inside of the grid before the position of the content in the grid is modified.

Referring to FIGS. 1-6, the method 600 is an example implementation of the track sizing algorithm 500. For example, block 501 corresponds to block 601-603, and block 502 corresponds to block 601-603.

As shown in block 601, track sizes are initialized. Each track has a base size, which can be considered a length. The length of the track can grow during the implementation of the track sizing algorithm. Further, each track has a growth limit, which can be considered a maximum track size. In response to the track reaching its growth limit, the track stops growing.

As shown in block 602, the intrinsic track sizes can be resolved. The method 500 assesses the content inside each grid. The method 500 can determine to grow the track such that the track encompasses the content in the grid. Content that can be contained within one grid can be assessed first. Subsequently, content that spans multiple grids and thus affects multiple tracks can be assessed.

As shown in block 603, the track sizes are maximized. Thus, extra space in the container can be allocated to grids and their corresponding intrinsic track sizes until the tracks reach their growth limit. In some arrangements, the tracks that are maximized can be flexible tracks. For example, a flexible track can be defined by the fraction of available space in the container. In other arrangements, the tracks that are maximized can be auto tracks. For example, an auto track can be defined by the content inside of the grid. In some arrangements, the Track Sizing algorithm can call an Auto Sizing algorithm. Thus, in determining the track size, the central processing unit 102 can perform auto sizing. The Auto Sizing algorithm can size the horizontal and vertical tracks by evaluating the size of the tallest item within the digital content and sizing the tracks such that they encompass the tallest item within the digital content. In some arrangements, the tallest item within the digital content can be a pixel in text. In other arrangements, the tallest item within the digital content can be a pixel in a graph.

While various arrangements of the present solution have been described above, it should be understood that they have been presented by way of example only, and not by way of limitation. Likewise, the various diagrams can depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which can be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the corresponding functions described herein. Additionally, for purpose of discussion, the various modules are described as discrete modules; however, as would be apparent to one of ordinary skill in the art, two or more modules can be combined to form a single module that performs the corresponding functions according arrangements of the present solution.

Additionally, memory or other storage, as well as communication components, can be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains can be used without detracting from the present solution. For example, functionality illustrated to be performed by separate processing logic elements, or controllers, can be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for layout design comprising:
   creating, by a processor, a container used to display a graphic;
   generating, by the processor, at least one of one or more horizontal tracks and one or more vertical tracks housed within the container, at least one of the one or more horizontal tracks and one or more vertical tracks creating one or more grids in the container, the one or more horizontal tracks and the one or more vertical tracks defined by a first user preference;
   placing, by the processor, digital content inside at least one of the one or more grids, the processor placing the digital content based on a second user preference;
   sizing, by the processor, the one or more horizontal tracks and the one or more vertical tracks, the sizing of the one of more horizontal tracks and the one or more vertical tracks based on the second user preference and the digital content inside the container;
   responsive to the sizing of the one or more horizontal tracks and the one or more vertical tracks, determining, by the processor, a proper placement of the one or more horizontal tracks and one or more vertical tracks, by repeating the sizing of the one or more horizontal tracks and the one or more vertical tracks; and
   outputting, by the processor an object, the object identifying parameters of the one or more horizontal tracks and the one or more vertical tracks.

2. The method of claim 1, wherein the layout design method is implemented via a programming language capable of implementing complex features on web pages.

3. The method of claim 1, wherein the layout design is implemented via an application program interface on a user device.

4. The method of claim 1, wherein the one or more horizontal tracks and the one or more vertical tracks are defined by the processor.

5. The method of claim 4, wherein the processor defines the one or more horizontal tracks and the one or more vertical tracks based on a fraction of the available space in the grid.

6. The method of claim 4, wherein the processor defines the one or more horizontal tracks and the one or more vertical tracks based on the size of the digital content.

7. The method of claim 4, wherein the processor defines the one or more horizontal tracks and the one or more vertical tracks based on position of the digital content.

8. The method of claim 1, wherein a relationship between the container and the one or more grids is defined by a parent-child relationship.

9. The method of claim 8, wherein a child in the parent-child relationship defines a style.

10. The method of claim 9, wherein the style is based on a third user preference.

11. The method of claim 9, wherein the styles is based on determinations made by the processor.

12. The method of claim 9, wherein the style comprises at least one of alignment preferences and overlapping content preferences.

13. The method of claim 8, wherein a parent in the parent-child relationship defines the container.

14. The method of claim 1, wherein generating, by the processor, at least one of one or more horizontal tracks and one or more vertical tracks housed within the container, further comprises:
generating, by the processor, one or more grid pads, the one or more grid pads placed at least adjacent to the one or more horizontal tracks and the one or more vertical tracks.

15. The method of claim 1, wherein the fitting by the processor is performed via an Auto Sizing algorithm.

16. The method of claim 15, wherein the Auto Sizing algorithm is based on one or more dimensions of the digital content within the corresponding grid.

17. The method of claim 1, wherein determining a proper placement of the one or more horizontal tracks and the one or more vertical tracks is performed via a Track Sizing algorithm.

18. The method of claim 17, wherein the Track Sizing algorithm further comprises:
initializing, by the processor, a track size;
resolving, by the processor, an intrinsic track size; and
maximizing, by the processor, the intrinsic track size.

19. The method of claim 1, wherein identifying parameters of the one or more horizontal tracks and the one or more vertical tracks further comprises:
identifying an x2 value, where x2 is the sum of an x value and a width value, wherein the width value is based on a width dimension of the container and the x value is based on a width dimension of the digital object; and
identifying a y2 value, where y2 is the sum of a y value and a height value, wherein the height value is based on a height dimension of the container and the y value is based on a height dimension of the digital object.

20. A computer program product comprising a computer-readable program medium code stored thereupon, the code, when executed by a processor, causing the processor to implement a method recited in claim 1.

* * * * *